Figure 1:
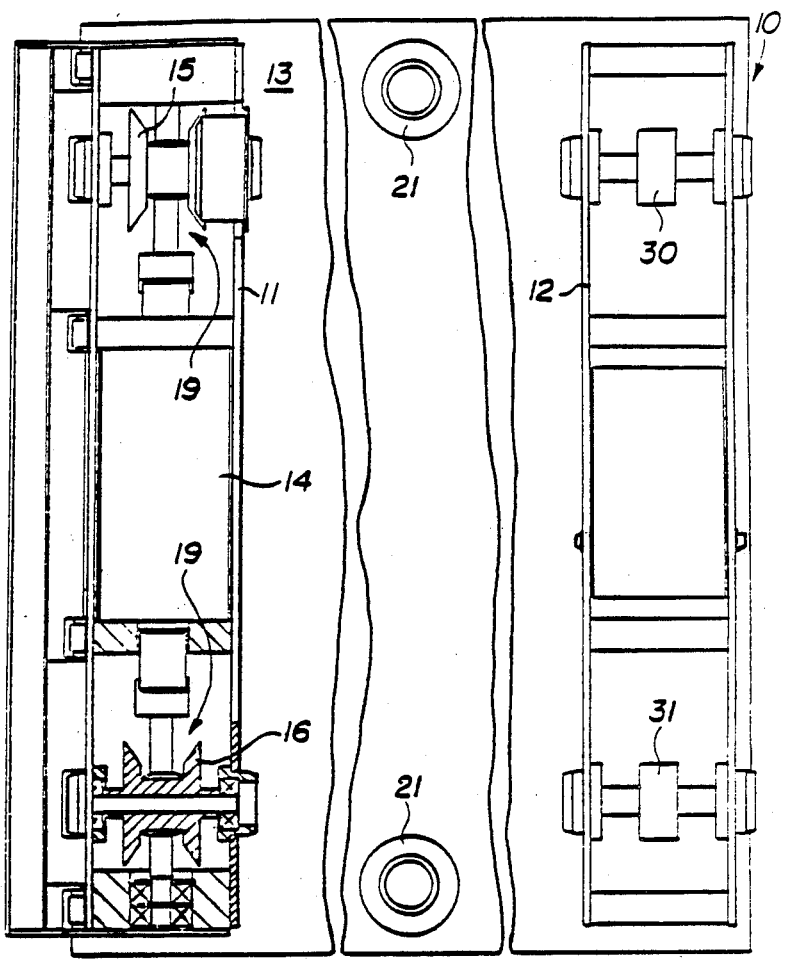

United States Patent [19]

Horvath et al.

[11] Patent Number: 4,940,000
[45] Date of Patent: Jul. 10, 1990

[54] MODULAR INSTALLATION FOR CONTROLLED TRANSPORT OF PARTS OR PRODUCTS

[75] Inventors: Laszlo Horvath, Geneva, Switzerland; Georges Martin, Collonges S/Saleve, France; Heiner Schween, Gummersbach, Fed. Rep. of Germany

[73] Assignee: Sysmo S.A., Switzerland

[21] Appl. No.: 44,847

[22] PCT Filed: Jul. 16, 1986

[86] PCT No.: PCT/CH86/00098
§ 371 Date: Apr. 16, 1987
§ 102(e) Date: Apr. 16, 1987

[87] PCT Pub. No.: WO87/00493
PCT Pub. Date: Jan. 29, 1987

[30] Foreign Application Priority Data
Jul. 17, 1985 [FR] France ................ 85 11048

[51] Int. Cl.$^5$ .............................................. B60L 15/38
[52] U.S. Cl. .................................. 104/295; 104/252; 105/49
[58] Field of Search ............... 104/27, 288, 295, 301, 104/250, 251, 252; 105/49, 180; 198/345, 346.1

[56] References Cited

U.S. PATENT DOCUMENTS

| 494,319 | 3/1893 | Brown | 105/180 |
| 1,769,110 | 7/1930 | Creveling | 105/118 |
| 3,696,756 | 10/1972 | Elmore et al. | 198/345 X |
| 4,253,559 | 3/1981 | Myers et al. | 198/345 |
| 4,335,381 | 6/1982 | Palmer | 104/301 X |
| 4,390,172 | 6/1983 | Gotman | 198/345 X |
| 4,620,280 | 10/1986 | Conklin | 104/295 X |

Primary Examiner—Stephen M. Hepperle
Attorney, Agent, or Firm—Lerner, David, Littenberg, Krumholz & Mentlik

[57] ABSTRACT

The present invention relates to a modular installation for controlled transport of parts or products. This installation includes at least one autonomous pallet (10) carrying a traction mechanism, preferably in the form of an electric motor-brake (14), this pallet being provided with wheels (15, 16, 30, 31) for circulation on a rail network, conveying the motor feed current and the control signals for the traction mechanism of the pallet. The pallet comprises two girders (11 and 12) and a plate (13) provided with two centering pins (21). The installation is advantageous in that it is flexible and allows an adaptation to all utilizations, especially because the pallets may be managed individually by a central data processing unit.

16 Claims, 8 Drawing Sheets

MODULAR INSTALLATION FOR CONTROLLED TRANSPORT OF PARTS OR PRODUCTS

The present invention relates to a modular installation for controlled transport of parts or products in a production, assembly or processing line or the like, including a rail network and at least one pallet adapted for circulation on said network.

Different systems are known for the transfer of assembling supports or product pallets designed for circulation on a rail network. In most of these systems, the supports or pallets movable on the rails are driven by various chain or gear mechanisms, and the network generally has the form of a fixed installation mounted in a quasi-definitive manner, capable of assuming the functions defined by the operations which the parts or products have to go through in the course of their production, assembly or processing.

The main drawback of these installations is their lack of flexibility. Their intended purpose is unique and exclusive.

In enterprises where manufactured products go through perfectly defined and unchanging operations, and where the quantities of products made justify the very high investment which the acquisition of a transfer system of known type represents, these installations may be considered to be adapted to their utilization.

However, one may observe in industry a more and more marked tendancy to diversification and establishing small production or assembly units designed for the production of relatively small product series. In workshops charged with producing and assembling such small series of parts, it is unthinkable to envisage the automation of operations by means of a the costly known installations, exclusively adapted to the fabrication of a single product. In these workshops, the acquisition of an automated installation can not be envisaged unless it is capable of being rapidly adapted to different utilizations, that is, if it has a sufficient flexibility to allow it to undergo both a rapid modification of the rail network, that is, of the circuit followed by the pallets or the assembling supports, and a rapid modification of the functions, that is, the operations executed on the parts during their displacement on the network.

These requirements can in no case be met by the known systems, which constitutes a major drawback in the development of automation of the assembling operations of parts produced in relatively small series. It is proposed in the present invention to reduce the difficulties mentioned above and to make available to industry a modular installation with computerized control which allows to design from standard equipment a multitude of installations perfectly adapted to all sorts of applications, even if these applications are limited in time and have to be replaced by others for which an adaptation of the installation is indispensable.

This object is achieved by the installation according to the invention, as mentioned in the preamble, characterized in that said pallet is autonomous and includes its own traction mechanism, in that the installation is equipped with a central data processing unit for developing control signals to be transmitted to said traction mechanism of said pallet, and in that the rail network includes at least one section composed of a first rail element and a second rail element parallel to the first, these elements being designed to convey both said control signals and the feed current and to transmit them to the traction mechanism of the pallet.

According to a preferred embodiment, the rail network includes several independent sections, each of these sections being connected to the central data processing unit for transmitting to the traction mechanism of the pallet control signals corresponding to each section.

The central data processing unit advantageously comprises at least one programmable electronic control unit associated with the independent sections, each independent section preferably including at least one device for detecting the position of the pallets.

Each device for detecting the position of the pallets advantageously includes at least one analog sensor and/or a braking sensor, while the passage of a pallet from one section to an adjacent section may be detected by a passage sensor.

According to another embodiment, each pallet includes a first girder equipped with two wheels of which at least one is a driving wheel, a second girder equipped with two wheels and a plate mounted on the two girders in such a manner that its central zone is entirely free between the rails of the network, the two girders being disposed parallel to these rails.

One of the girders advantageously carries a motor for propelling the driving wheels.

The pallet preferably includes at least one brake associated with at least one of the driving wheels.

According to another preferred embodiment, the plate is equipped with two centering sockets adapted to cooperate with mobile centering pins.

The centering pins are preferably solid with a platform forming an anvil and carried by fixed bearing supports, the corresponding section of the network being mounted on a support adapted to be brought into a surbased position with respect to the adjacent sections.

The support of the section may be associated with at least one hydraulic or pneumatic jack.

According to a particularly advantageous embodiment, the installation includes at least one vertically mobile slide, the pallet including at least one device adapted to cooperate with said slide to generate a detection and/or control signal.

The centering pins are advantageously solid with vertically mobile elements, these elements each including an inclined ramp adapted to cooperate respectively with slides arranged for horizontal displacement by a jack, and carrying elevating blocks.

These centering pins preferably have heads with different profiles.

Each pallet is advantageously associated with a code and at least one of the sections includes means for detecting this code.

The traction mechanism of the pallet is preferably adapted to allow the latter to circulate forwards or backwards.

According to a particular embodiment, the network includes a support structure carrying the rails, made by means of a metallic profiled section provided with axial grooves adapted to receive insulating blocks for carrying the rails.

Figure 2:
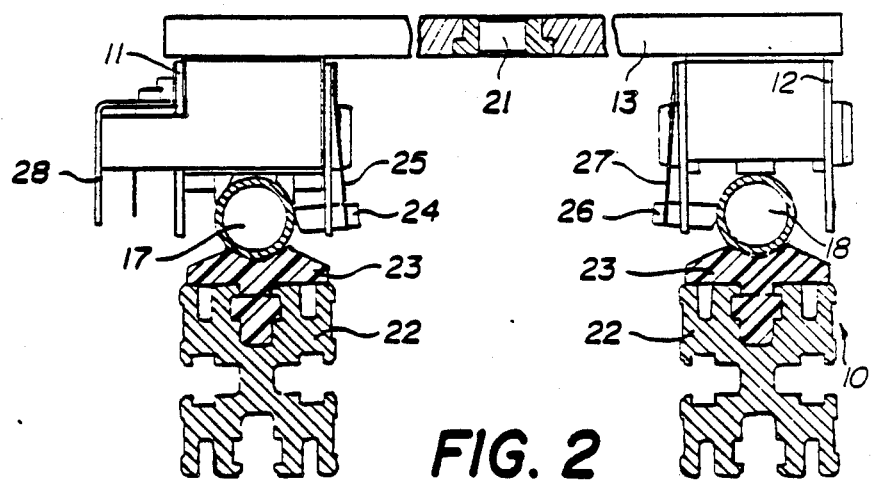
Figure 3:
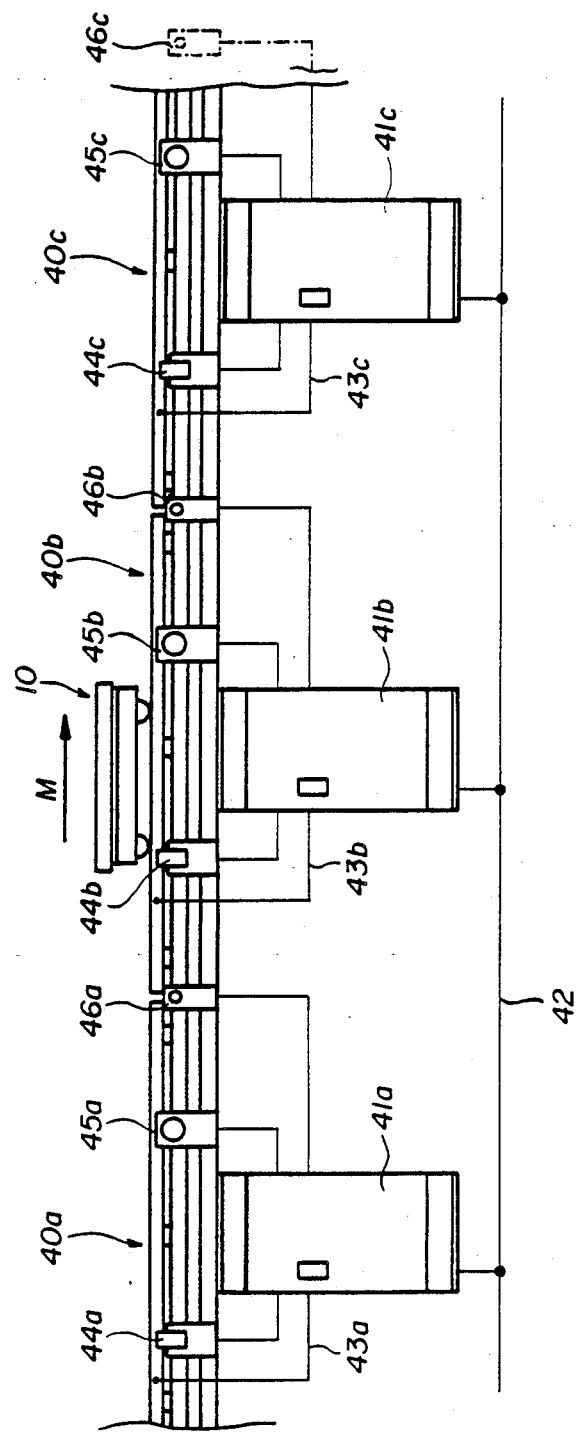
Figure 4A:
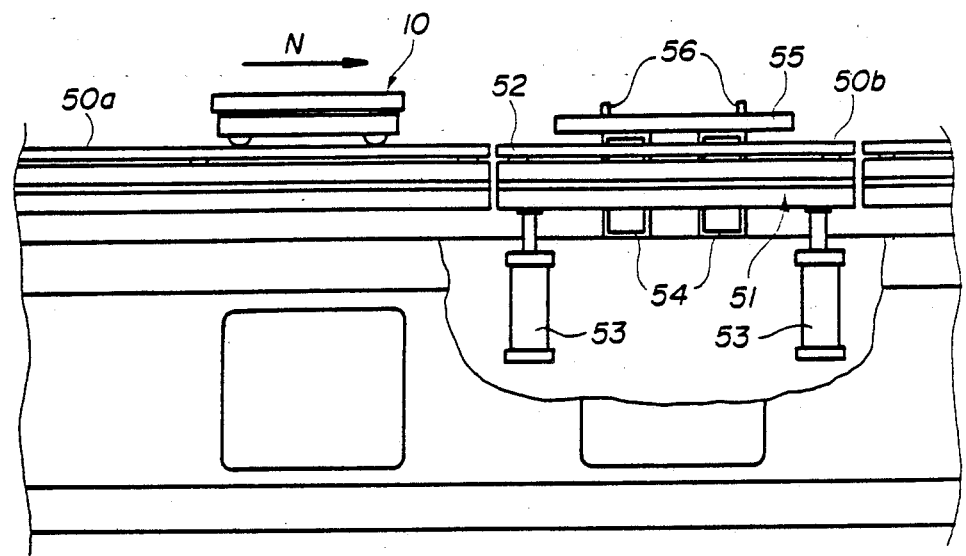
Figure 4B:
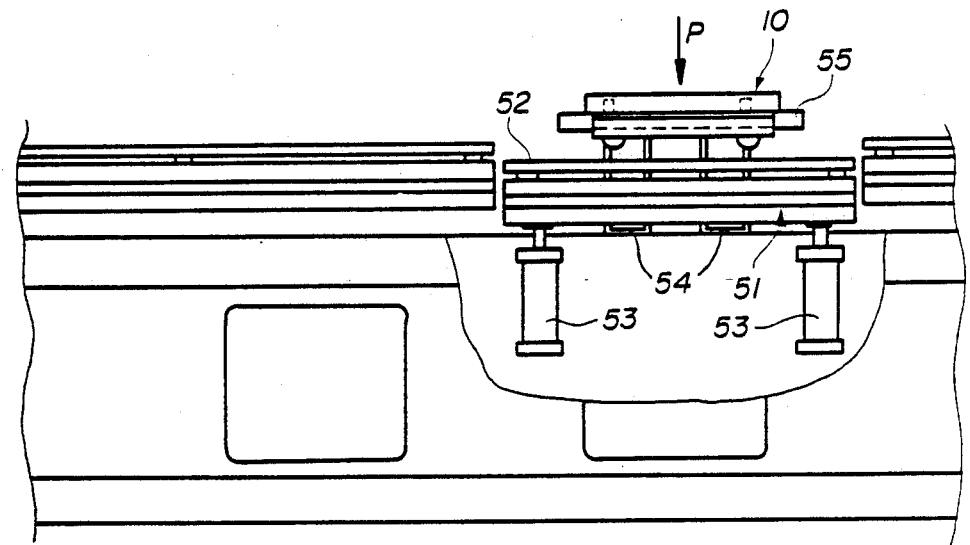
Figure 5:
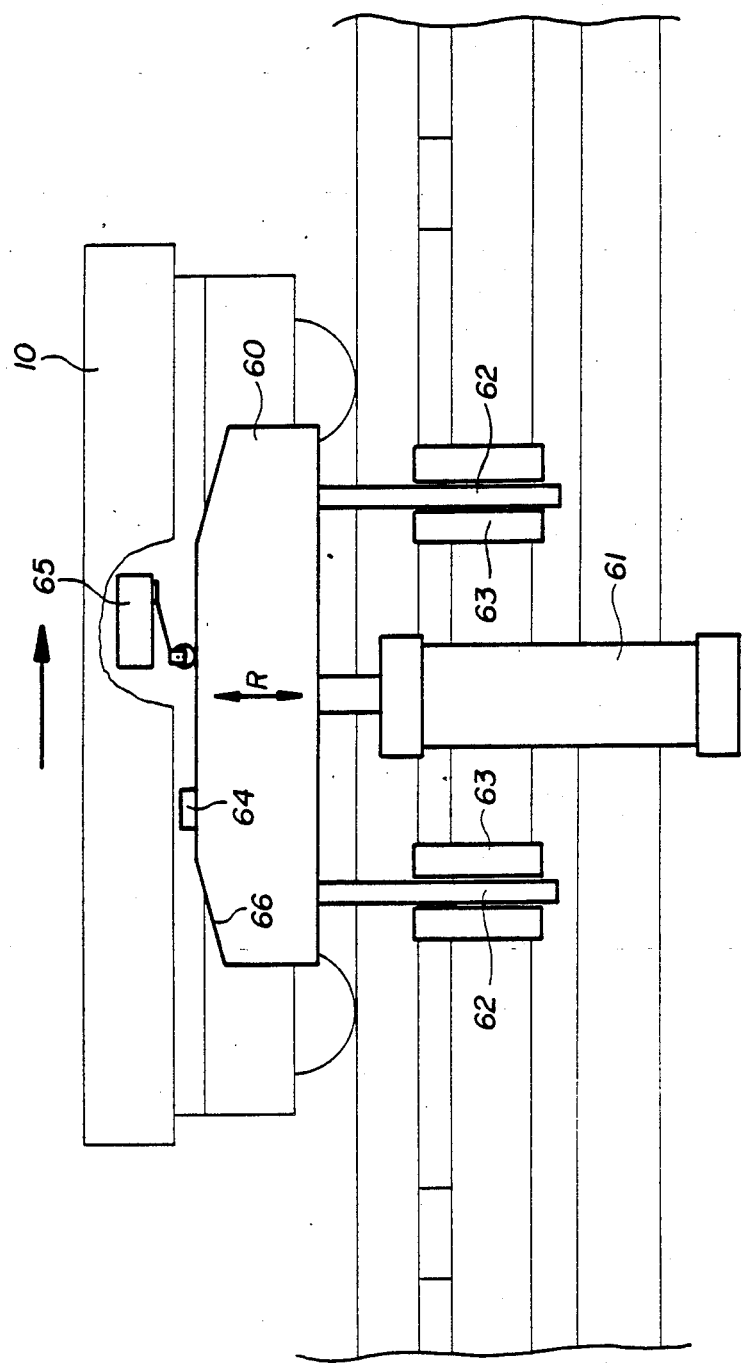
Figure 6A:
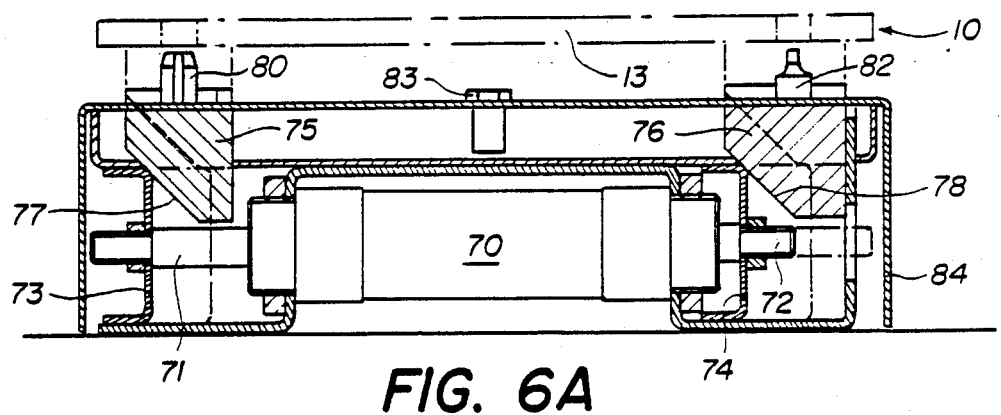
Figure 6B:
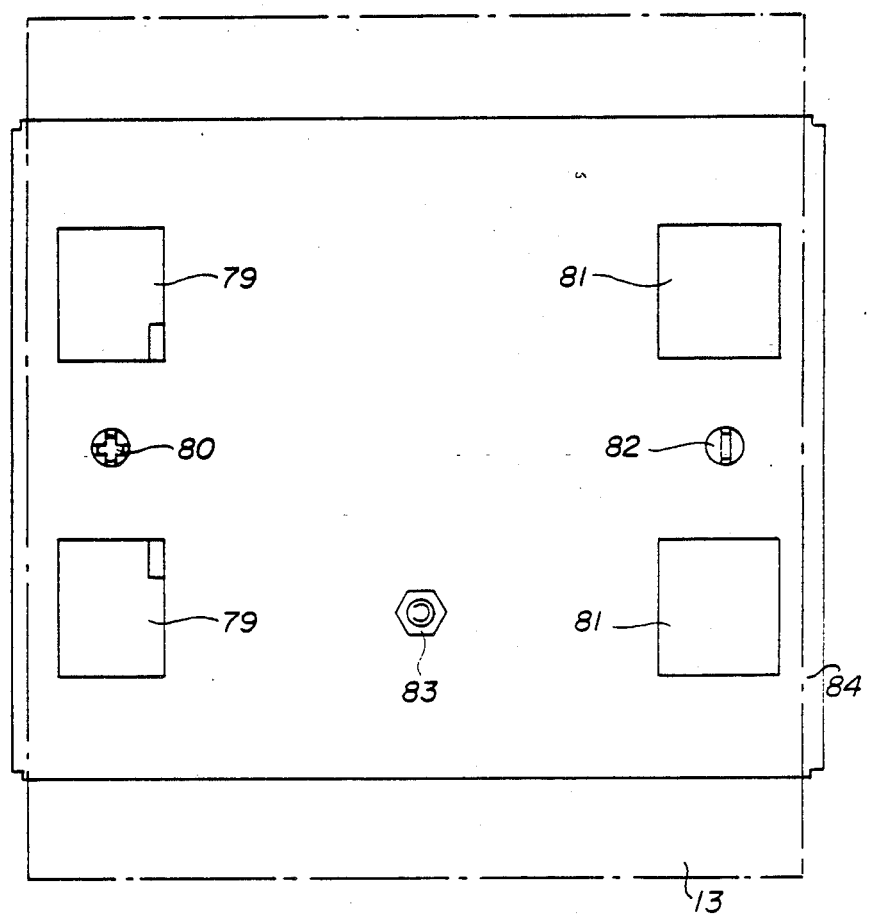
Figure 7A:
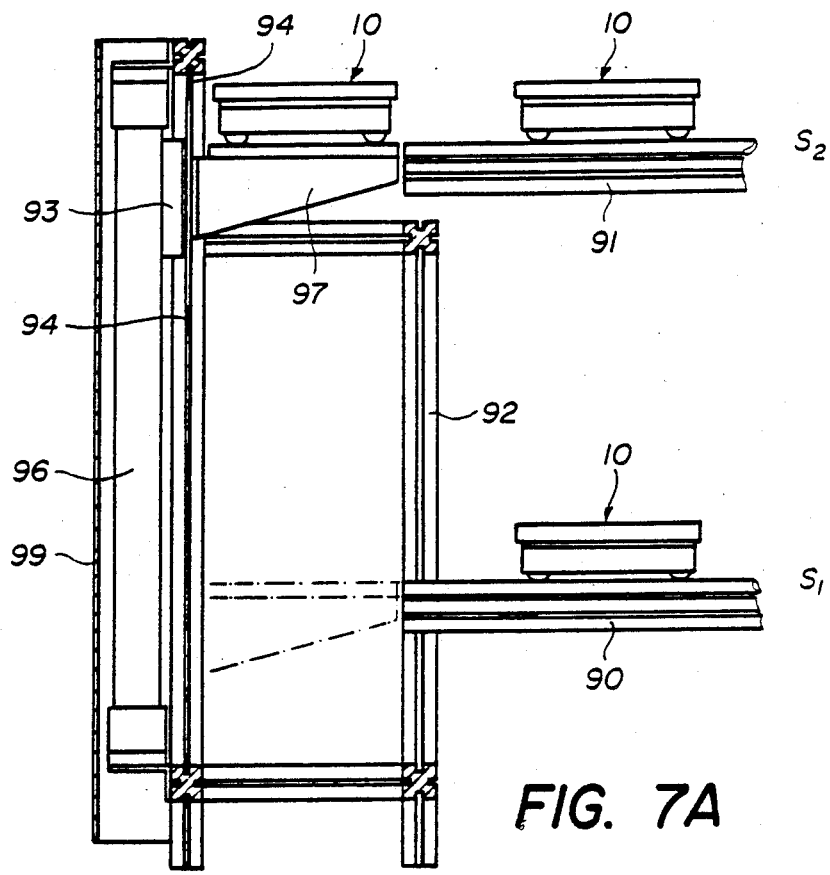
Figure 7B:
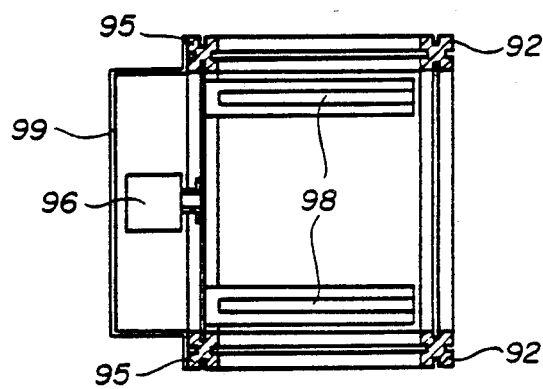
Figure 8A:
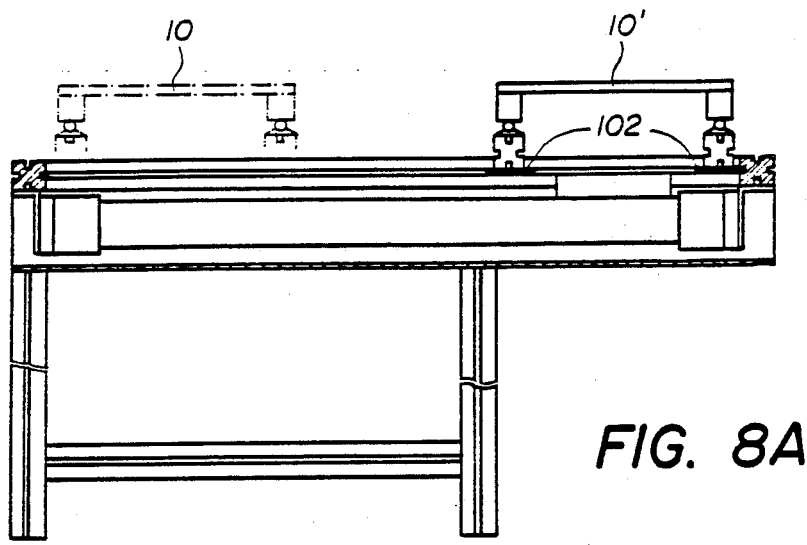
Figure 8B:
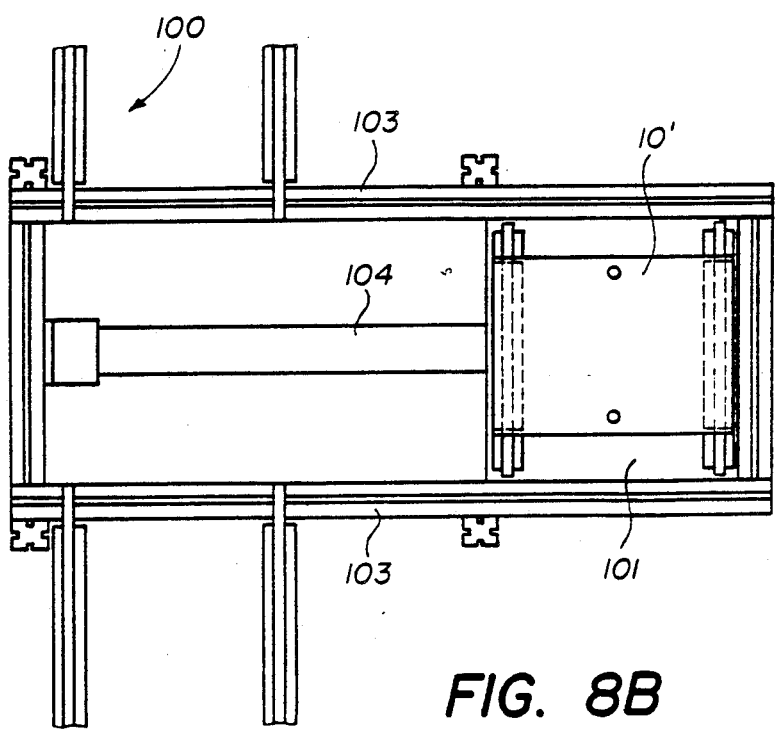
Figure 9:
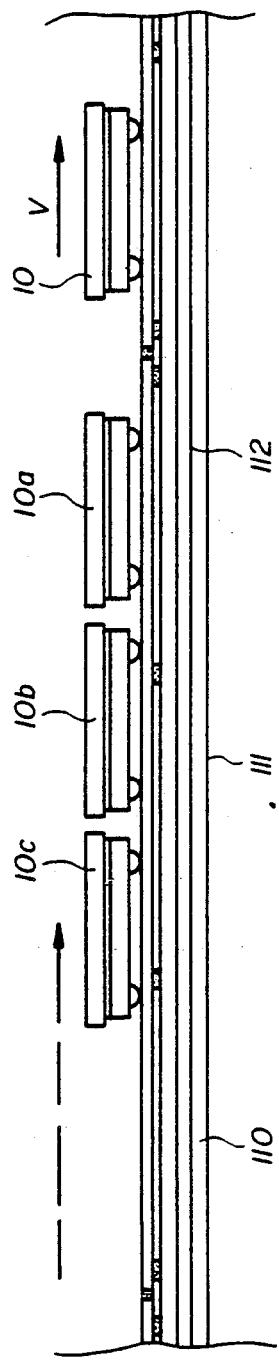

The present invention will be better understood with reference to the description of an example of an embodiment and to the accompanying drawings wherein:

FIG. 1 represents a view from above, in partial section, of a preferred embodiment of a pallet such as is used in the installation according to the invention, FIG. 2 represents a front view, in partial section, of the pallet represented in FIG. 1, placed on rails, FIG. 3 represents a schematic elevation view of a part of the rail network of the installation according to the invention, FIGS. 4A and 4B illustrate a mode of access to the lower face of the pallet and means allowing relatively high descending vertical forces to be applied to a pallet or the products it transports, FIG. 5 illustrates another mode of access to the bottom face of a pallet, FIGS. 6A and 6B represent an embodiment of a mechanism for setting elevating blocks designed to raise a pallet to a determined location in the circuit, FIGS. 7A and 7B illustrate an advantageous embodiment for the vertical transferring of pallets between first and second network levels FIGS. 8A and 8B represent a mode of lateral transfer of a pallet to a given location in the circuit, for example to bring it to a manual or automatic working place, and FIG. 9 illustrates a buffer zone provided on the rail circuit.

With reference to FIGS. 1 and 2, a pallet 10 is essentially composed of two girders 11 and 12 bridged by a plate 13 which constitutes for example a support for assembling parts, or for the transfer of parts or products from a working place such as for example a loading place, to another handling or assembling station or to a take up or processing station etc. The girder 11 carries an electric motor 14 of the motor-brake type which is coupled to at least one, but preferably to the two wheels 15 and 16 which are profiled to be adapted to the rails of circular section 17 and 18 (see FIG. 2). This mechanical coupling between the motor 14 and the wheels 15 and 16 is effected by means of a transmission mechanism of a type known per se and comprising in particular a return gear which meshes directly with a pinion solid with the axles of the wheels.

The motor-brake 14 or an independent mechanical or electrical brake (not shown) is associated with the driving wheels and allows the pallet to be stopped at a given place in the rail network or to reduce its speed on a given section. Two centering sockets 21 are provided in the plate 13 to permit precise indexing of the pallet in a work station located on the circuit.

As is shown more particularly in FIG. 2, the central part of the pallet is entirely free at its lower face and only includes in this zone the plate 13 which connects the girders 11 and 12. This construction has the advantage of permitting access to the bottom face of the pallet, as will be explained for example below, to support it by means of an anvil block for all operations necessitating the application of a force which the structure carrying the rails would not be able to absorb without risk of deformation.

This structure is essentially composed of metallic profiled sections 22 adapted to receive insulating blocks 23 which carry the rails 17 and 18.

The pallet moreover includes a first brush 24 acted upon by a spring 25 to bear upon the rail 17 and a second brush 26 acted upon by a spring 27 to bear upon the rail 18. A fairing 28 is mounted on one of the sides of the pallet.

The pallet moreover comprises two wheels 30 and 31 mounted symmetrically to the wheels 15 and 16 with respect to the axis of the pallet.

It is observed that the profiled section used to mount the structure for supporting the rails is largely hollowed to permit making a particularly light set of supports. In addition, the different recesses are designed to facilitate mounting the connecting elements such as transverse bars, etc., which permits the construction of a network that is adapted to all requirements and may be easily assembled and dismantled.

FIG. 3 essentially shows three independent sections 40a, 40b and 40c of the rail network on which the pallets 10 circulate in the direction of the arrow M. A programmable electronic control unit 41a, 41b and 41c is respectively associated with each of the independent sections. These electronic control units represented as independent units are in fact components of the central processing unit and are preferably accomodated in a common control box. The supply of these circuits is ensured by a cable 42. The power supply of the rail sections of the network is ensured by connecting cables 43a, 43b and 43c.

Moreover, with each control unit are associated a braking sensor 44a, 44b and 44c, an analog sensor 45a, 45b and 45c respectively and a sensor 46a, 46b and 46c respectively of passage from one section to the next. The analog sensors 45 allow the position of the pallets to be detected with a high precision. The analog sensors 45 and the braking sensors 44 could be combined in a single sensor mounted at a selected location in the section.

It is well understood that the invention is not limited to arrangement of the sensors defined above. On certain sections intended solely for transfer of the pallets, certain sensors may be absent or be replaced by other components. Similarly, several sensors of the same type could be mounted at different mutually spaced points of the same section of the network. Such sensors might for example be provided in the case where the advance of a pallet must be effected at different speeds at certain locations of the same section of the network.

In the embodiment illustrated in FIG. 3, the braking sensors are advantageously intended for engaging the braking of the pallets, that is, to control the motor-brake 14 acting on the wheels 15 and 16 to reduce the speed of displacement of this pallet, and the analog sensors 45 preferably serve to achieve stopping a pallet in a perfectly defined position. This position generally corresponds to a manual or automated working place or to take up of the pallet by an arrangement ensuring its vertical or lateral transfer in direction of a junction provided on the network or towards a parallel network.

When the pallets are as previously mentioned supplied with current through one of the rails, switching off the supply may be effected by the central processing unit individually for one or several network sections concerned, by the corresponding programmable control units. It will be noted, however, that the pallets might also be supplied permanently or during selected time intervals by a cell or battery mounted on or under the plate 13.

In practice, one electronic control unit manages one rail section. However, the same control may manage several rail sections.

When the pallets pass from one section to the next, the electronic control units set these sections at the same voltage.

FIGS. 4A and 4B illustrate two successive phases of travel carried out by a pallet 10. In the installation shown in FIG. 4A, the pallet 10 circulates in the direction of the arrow N on a first independent section 50A and gets ready to engage in a second independent section 50b.

On this section, the structure 51 designed to support the rails 52 is associated with two hydraulic or pneumatic jacks 53 adapted to displace this structure 51 to a low position as is shown in FIG. 4B. The carrying structure 54 supports a platform 55 equipped with two centering pins 56 adapted to cooperate with the centering sockets 21 provided in the plate 13 (see FIG. 1) of the pallet 10.

In its position represented in FIG. 4B, the structure 51 carrying the rails 52 is brought into its low position by the jacks 53. As the bearing blocks carrying the platform 55 are fixed in height, the fact that the carrying structure 51 is lowered has as consequence that the pallet 10 is deposited on the platform 55 in a position defined by the centering pins 56. In this position, the load of the pallet 10 and all the forces exerted in the direction of the arrow P on the plate 13 or on parts deposited on this plate are fully supported by the bearing blocks 54. Consequently, as no appreciable stress is exerted on the rails or the carrying structure 51, this structure may be relatively light and hence easy to install and to transform.

It will however be noted that this particularly advantageous feature of the described installation is essentially obtained due to the fact that the central part of the bottom face of the pallet 10 is completely free and allows the access of different members such as, in the present case, the bearing blocks 54, and to the utilization of fixed rails mounted on a tubular structure for the construction of the network.

FIG. 5 illustrates another advantage derived from this same structural feature of the pallet 10. On one of the independent sections of the network, the installation may be equipped with a slide 60 mobile in translation in the direction of the double arrow R, actuated by a hydraulic or pneumatic jack 61 and guided by two columns 62 movable in fixed sleeves 63. The slide 60 may carry a detector 64 of any type, for example of the optical, mechanical or electronic type, adapted to cooperate with a component (not shown) carried by the pallet 10 and serving to act on the control means of the latter.

A switch 65 also carried by the pallet 10 may cooperate with the ramp 66 of the slide 60 to transmit a control signal to the electronic circuit 29 (see FIG. 1) carried by the girder 12 of the pallet 10. This switch may for example serve to switch off the supply to the motor for driving the pallet or to trigger a braking signal etc.

FIGS. 6A and 6B illustrate a mechanism other than that of FIGS. 4A and 4B for mounting bearing blocks designed to take up the plate 13 of a pallet 10 and to effect on this plate operations in the course of which more or less significant forces will be applied to the plate or to the parts it transports. This mechanism is essentially composed of a horizontally disposed jack 70 provided with two mobile rods 71 and 72 respectively solid with two slides 73 and 74 designed to act respectively on two transversal elements 75 and 76, and more particularly on the sliding ramps 77 and 78, disposed for example at 45° and solid with these elements. The element 75 is solid with the elevating blocks 79 and with the centering pin 80 while the element 76 carries the elevating blocks 81 and the centering pin 82. The two centering pins 80 and 82 have heads with different profiles, which not only permits precise positioning of the pallets but further allows control of the orientation of these pallets on the rail network. A detector 83 is mounted in the upper wall of a casing 84 covering the entire mechanism described above. This detector is designed to cooperate with a component (not shown), mounted at the bottom face of the plate 13 of the pallet 10.

The arrangement described and represented with reference to FIGS. 6A and 6B further allows indexing the pallets 10 with high precision. Such indexing is often required when the pallets serve to transfer different parts intended for assembly in different automated assembling places.

FIGS. 7A and 7B illustrate an elevator arrangement adapted to bring the pallets 10 from a first network section 90 whose rails lie at a level S1 onto a second section 91 whose rails lie at a level S2 or inversely. To this end, the installation includes a support 92 made by means of profiled sections similar to profiled sections 22 of FIG. 2, a plate 93 sliding by means of skids 94 in appropriate grooves of the two lateral columns 95 and a hydraulic or pneumatic jack, a winch or any other appropriate mechanism for displacing a mobile carriage 97 solid with the sliding plate 93. Two rail sections 98 are mounted on the mobile carriage 97 to allow displacement of the pallets 10 and their passage onto the rails of the sections 90 and 91, when the carriage 97 is brought either to the level S1 or to the level S2.

A protective cover 99 is mounted at the rear of the support or of the column of the elevator arrangement to protect the winch or the jack 96.

Given that the sections of the network are totally independent, the upper section 91 and the lower section 90 necessitate no electrical connection nor any mechanical connection between each other. In addition, the levels S1 and S2 may be any desired levels, given that the only constraint consists in programming the mechanism for controlling the mobile carriage 97 as a function of these levels. Whereas only the levels S1 and S2 are represented in this figure, it is quite evident that one might provide for a whole series of intermediate levels and to make an arrangement for manual or automatic sorting to distribute the pallets between the sections corresponding to the different levels according to a preset coding.

FIGS. 8A and 8B illustrate means for laterally transferring pallets for example to a manual working place offset with respect to the general direction of the network. A pallet 10 coming from a network section 100 may be momentarily brought to the position 10′, offset with respect to the section 100, to a manual working station. To this end, the installation includes a sliding support plate 101 movable on sliding skids 102 adapted to slide in a lateral groove of two crosspieces 103, cut out for example in the metallic profiled section utilized to make tne whole structure carrying the rails. The sliding support plate may be actuated by a hydraulic or pneumatic jack 104 or by the other mechanism such as for example a chain system driven by a motor etc.

It is well understood that this arrangement for lateral transfer is not limited to the embodiment described and illustrated. Hence, the sliding support plate could be utilized to effect sorting of the pallets by succesively taking up the pallets coming from an entry section and distributing them selectively on different exit sections (not shown).

FIG. 9 illustrates a buffer zone made on a network section 110 intercalated between two network sections 111 and 112 independent of each other. Several pallets 10a, 10b and 10c may be temporarily stored on the section 110 forming said buffer zone. At any moment the temporarily stored pallets may be set in motion and discharged in the direction of the arrow V via the discharge section 111.

The above description has allowed to illustrate a few embodiments of the installation according to the invention. However, thanks to the modular nature, and to the flexibility with which different components may be utilized, numerous other embodiments may be contemplated. One could in particular carry out combinations of different elementary assemblies represented in the figures.

The network line sections may have different lengths as needed. Compact buffer zones, in the form of a spiral could be carried out to allow temporary storage of the pallets. The latter could be coded in order that they may be sorted and follow a given path according to their code.

Another important advantage of this installation is that as opposed to existing systems, the energy consumption of the pallets is practically nil when the latter are halted. As a matter of fact, each pallet is controlled individually and may be advanced, moved backward or halted depending on the needs of the utilizer, according to a preset program.

Finally, one of the most outstanding advantages results from the possibility of access to the bottom surface of the plate of the pallets, which access is linked on one hand to the use of rails and on the other hand to the construction of the pallets themselves. This access more particularly allows the utilization of different detectors or signal generating devices mounted on the network or on the pallets and capable of intervening in the orientation of the pallets.

By these different artifices, it is possible to exercise precise and permanent control of all of the pallets and to intervene, if necessary, at any moment.

If for any reason the progress of work in a manual working place does not follow the progress in the other working places, it is possible to improvise a buffer zone on a given section of the network or to divert the pallets to a parallel network.

We claim:

1. A modular apparatus for the controlled transport of work pieces in a production, assembly or processing line, comprising
    (a) a modular network of interconnected track sections comprising first and second parallel rails, at least one of which is electrically powered, and first and second parallel rail support means, said first and second rails being respectively affixed to said first and second rail support means and said network of track sections comprising one or more work station track sections having a platform situated between said rails wherein said rail support means within said work station track section are capable of moving said track section rails to a position lower than said platform;
    (b) at least one self-propelled electrically powered wheeled vehicle adapted to ride upon said track section rails, said vehicle having a plate, mounted above said wheels, including a central support zone for engagement on the underside by said platform; and
    (c) a central data processing means capable of remotely controlling said vehicles.

2. The modular assembly of claim 1, wherein each work station track section rail support means is associated with at least one hydraulic or pneumatic jack for moving said work station track section rails.

3. The modular assembly of claim 1, wherein said platform further includes a plurality of centering fixtures and said vehicle plate further includes centering fixtures adapted to engage said platform centering fixtures.

4. The modular assembly of claim 3, wherein said platform centering fixtures comprise pins and said plate centering fixtures comprise sockets.

5. The modular assembly of claim 3, wherein said platform centering fixtures comprise first and second platform centering fixtures.

6. The modular assembly of claim 5, wherein said first and second platform centering fixtures have profiles, which profiles are different from each other.

7. The modular assembly of claim 1, wherein said vehicle comprises at least three wheels, at least one of which is a driving wheel.

8. The modular assembly of claim 7, further including a drive means associated with said driving wheel.

9. The modular assembly of claim 7, wherein said vehicle further comprises first and second parallel girders supporting said plate in a direction parallel to said track rails and astride said plate support zone, said first girder having two wheels mounted thereon, at least one of which is a driving wheel, and said second girder having at least one wheel mounted thereon.

10. The modular assembly of claim 9, wherein said drive means is mounted on said first girder.

11. The modular assembly of claim 7, wherein said vehicle includes at least one brake associated with a driving wheel.

12. The modular assembly of claim 1, wherein said at least one work station track section further includes a vertically mobile slide, and said at least one vehicle includes a device adapted to cooperate with said slide, said cooperation thereby generating a detection or control signal.

13. The modular assembly of claim 3, further comprising a plurality of vertical lifting elements on which said platform is mounted, and means for moving said vertical lifting elements in a vertical direction, said platform centering fixtures being attached to said platform above said vertical lifting elements.

14. The modular assembly of claim 13, further comprising a plurality of elevating blocks, attached above said platform astride said platform centering fixtures and above said vertical lifting elements.

15. The modular assembly of claim 1, wherein each vehicle further includes a code and at least one track section includes a means for detecting said code.

16. The modular assembly of claim 8, wherein said vehicle drive means is capable of driving said vehicle in both forward and reverse directions.

* * * * *